No. 749,730. PATENTED JAN. 19, 1904.
T. S. HALEY.
WIRE WORKING MACHINE.
APPLICATION FILED MAY 25, 1901.
NO MODEL. 14 SHEETS—SHEET 1.

No. 749,730. PATENTED JAN. 19, 1904.
T. S. HALEY.
WIRE WORKING MACHINE.
APPLICATION FILED MAY 25, 1901.
NO MODEL. 14 SHEETS—SHEET 4.

Witnesses
Inventor
Thomas S. Haley
By Simonds & Hart
Attorneys

No. 749,730. PATENTED JAN. 19, 1904.
T. S. HALEY.
WIRE WORKING MACHINE.
APPLICATION FILED MAY 25, 1901.
NO MODEL. 14 SHEETS—SHEET 5.

Witnesses
Inventor
Thomas S. Haley
Attorneys

No. 749,730. PATENTED JAN. 19, 1904.
T. S. HALEY.
WIRE WORKING MACHINE.
APPLICATION FILED MAY 25, 1901.
NO MODEL. 14 SHEETS—SHEET 6.
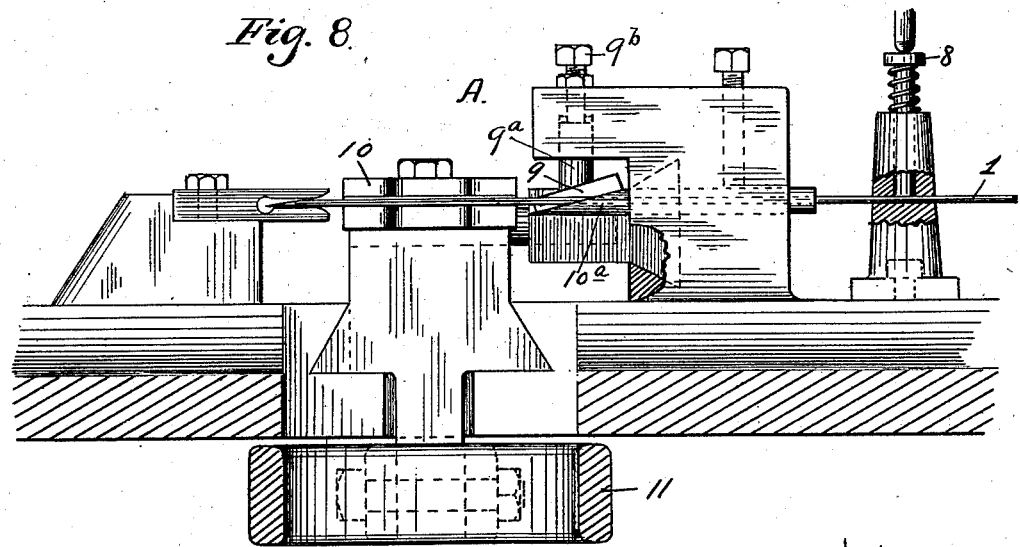
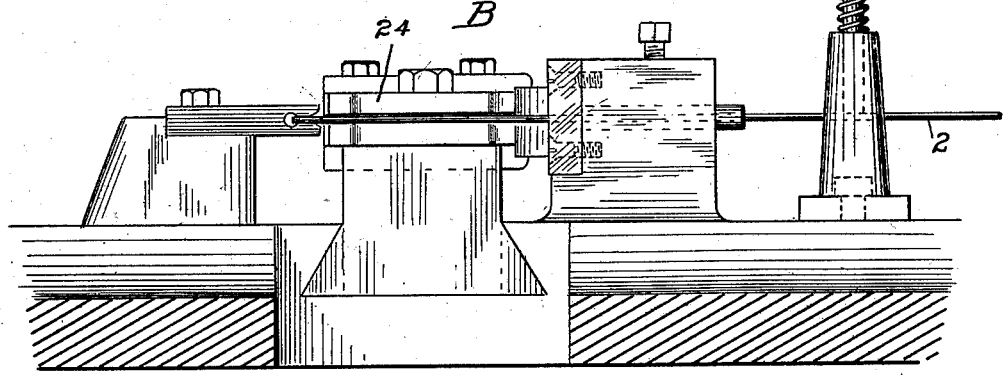

No. 749,730. PATENTED JAN. 19, 1904.
T. S. HALEY.
WIRE WORKING MACHINE.
APPLICATION FILED MAY 25, 1901.
NO MODEL. 14 SHEETS—SHEET 7.
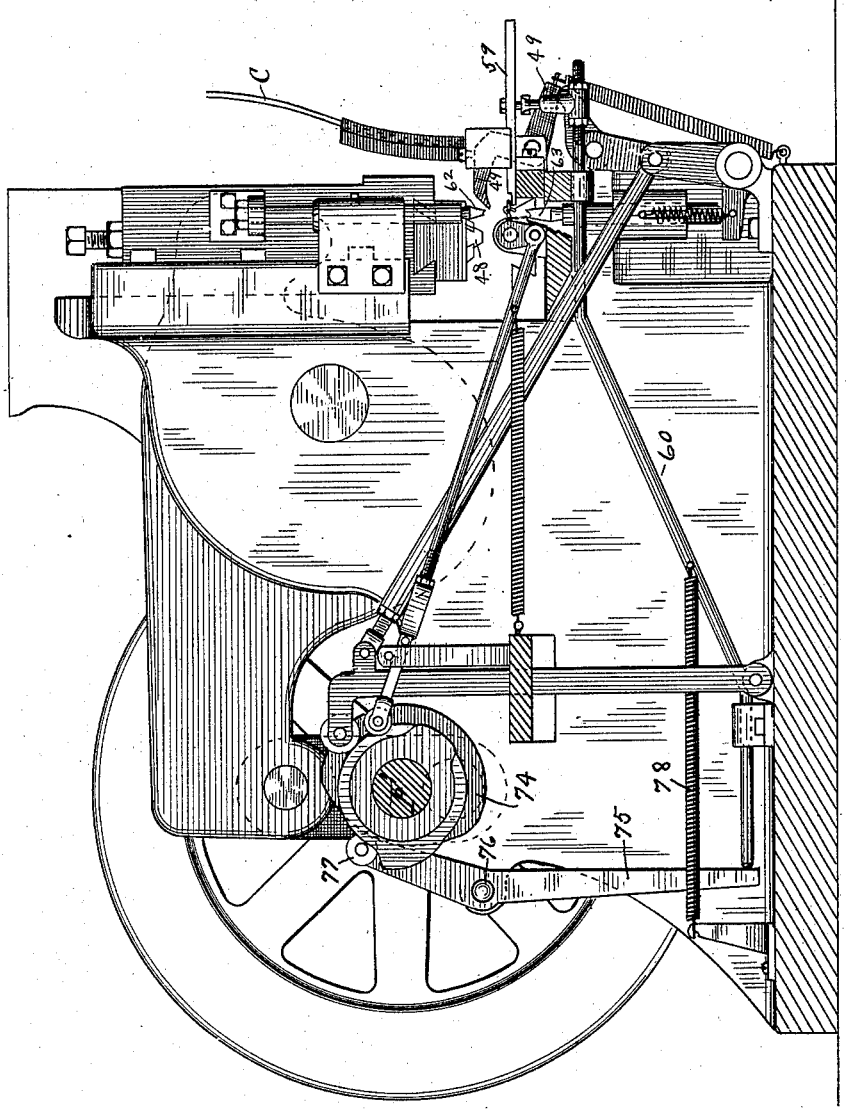
Witnesses
Inventor
Thomas P. Haley
Attorneys No. 749,730. PATENTED JAN. 19, 1904.
T. S. HALEY.
WIRE WORKING MACHINE.
APPLICATION FILED MAY 25, 1901.
NO MODEL. 14 SHEETS—SHEET 8.
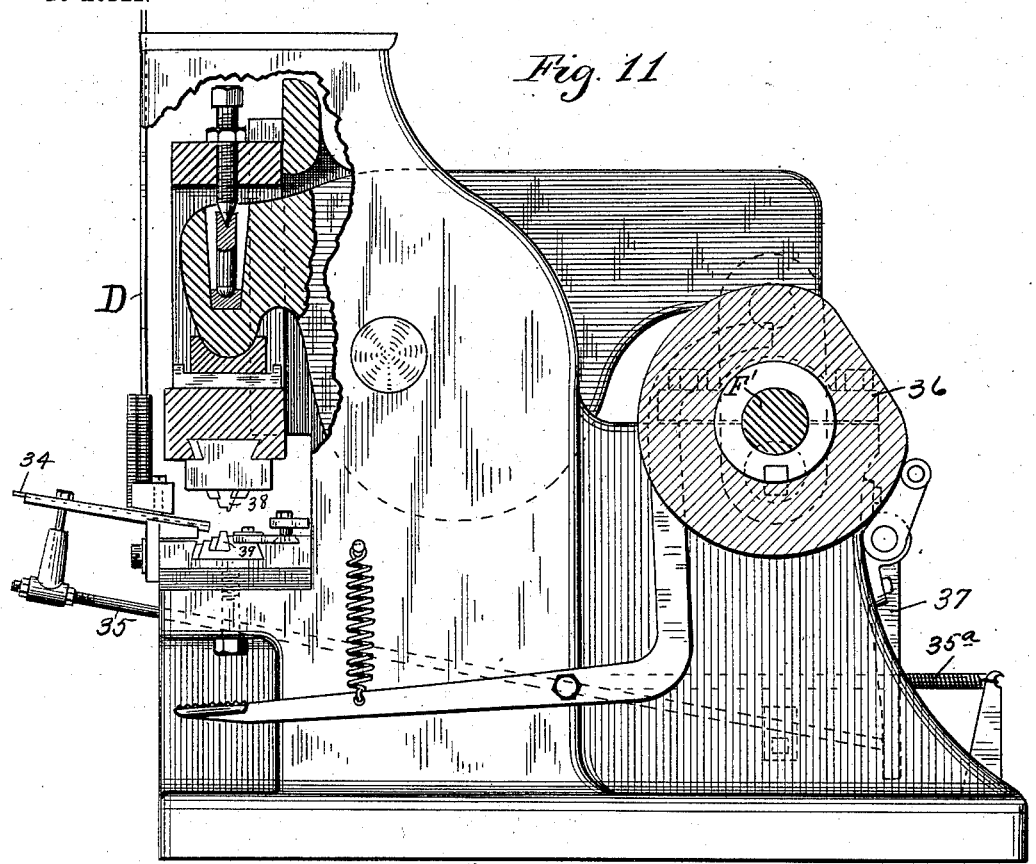
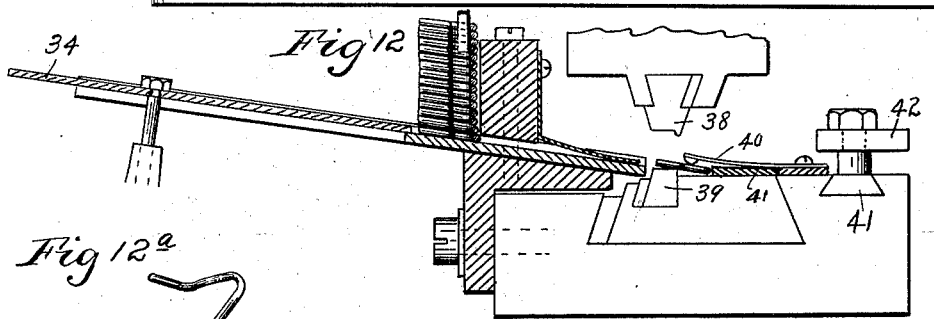
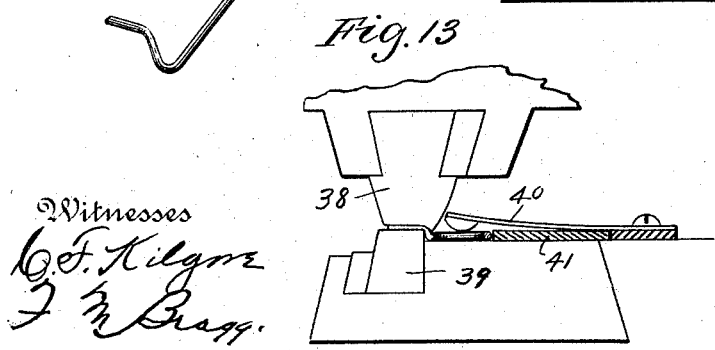
Witnesses
Inventor
Thomas S. Haley
Attorneys

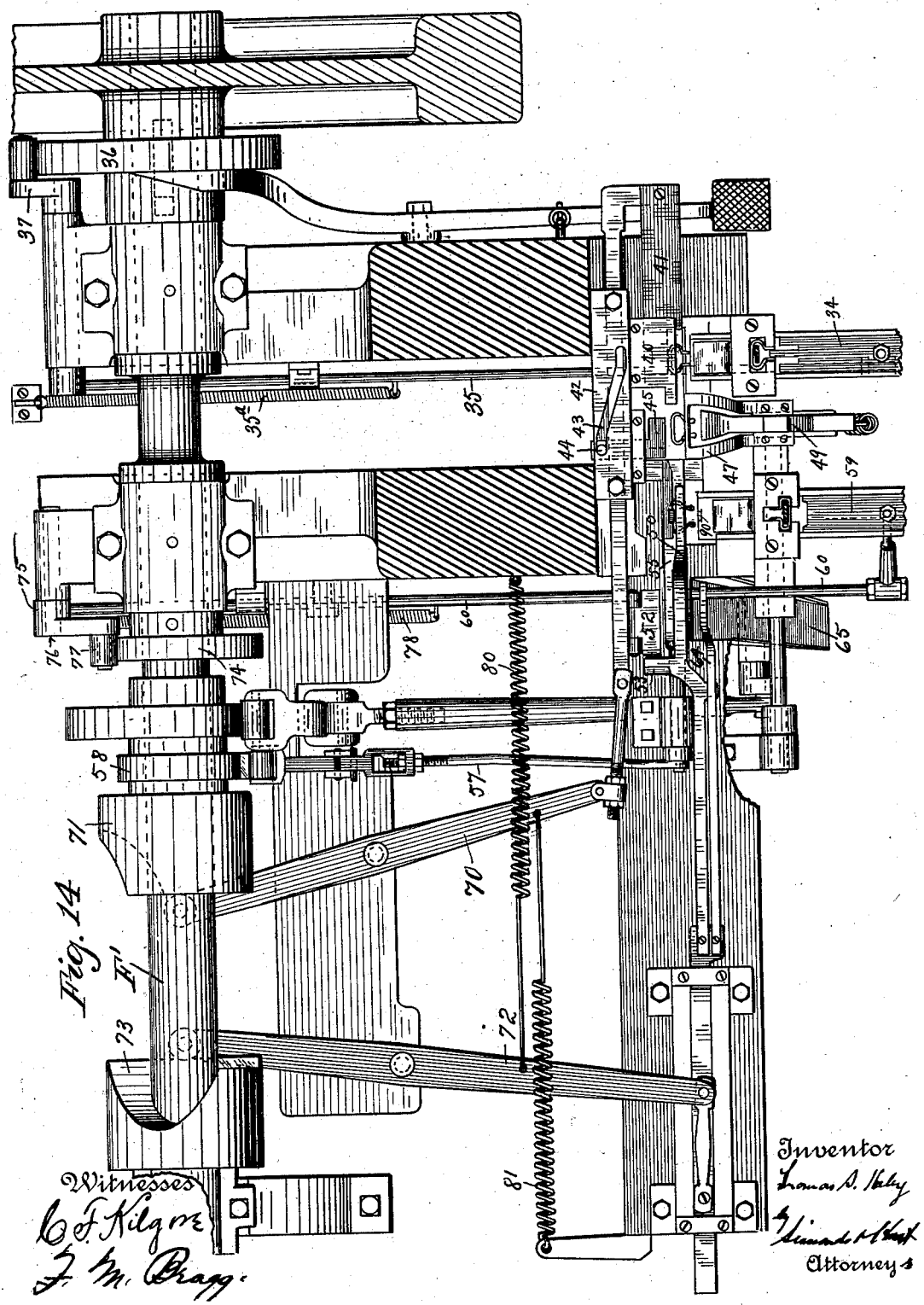

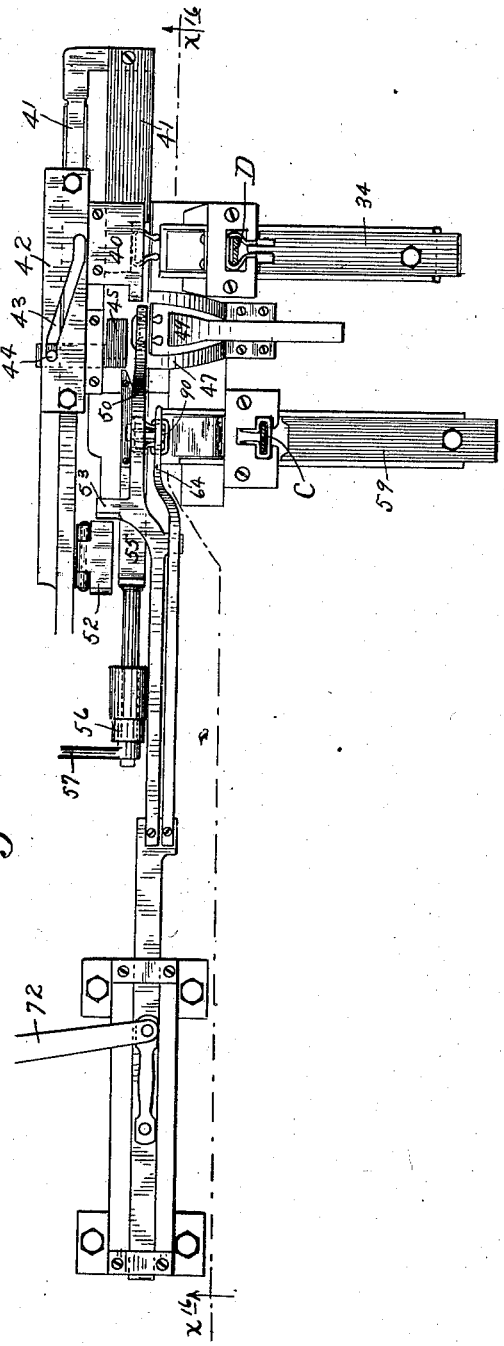

No. 749,730. PATENTED JAN. 19, 1904.
T. S. HALEY.
WIRE WORKING MACHINE.
APPLICATION FILED MAY 25, 1901.
NO MODEL. 14 SHEETS—SHEET 11.
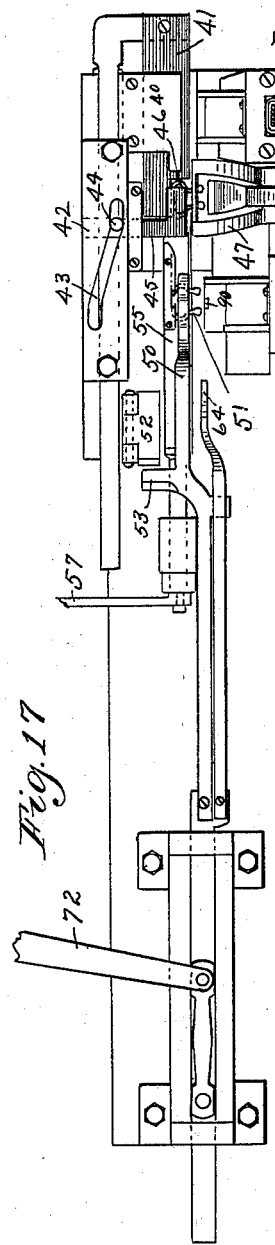
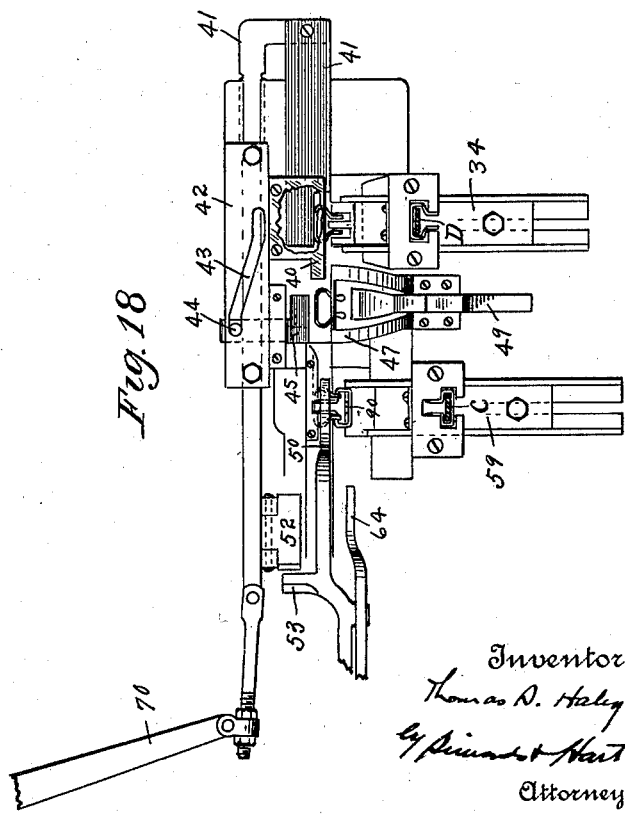
Witnesses
Inventor
Thomas S. Haley
Attorneys No. 749,730. PATENTED JAN. 19, 1904.
T. S. HALEY.
WIRE WORKING MACHINE.
APPLICATION FILED MAY 25, 1901.
NO MODEL. 14 SHEETS—SHEET 12.
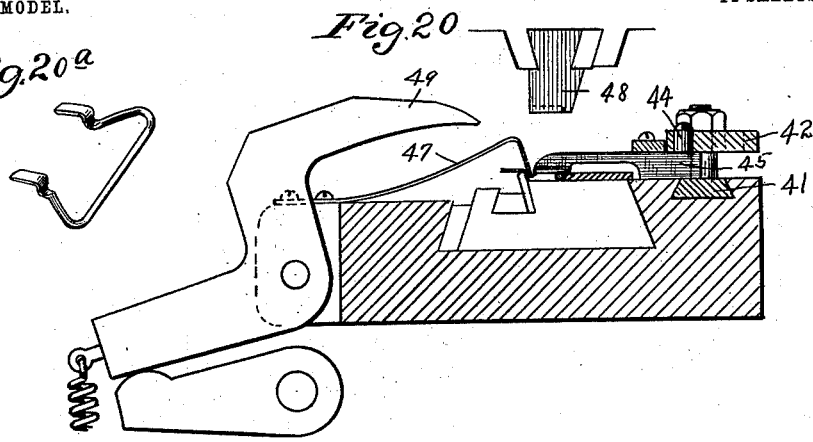
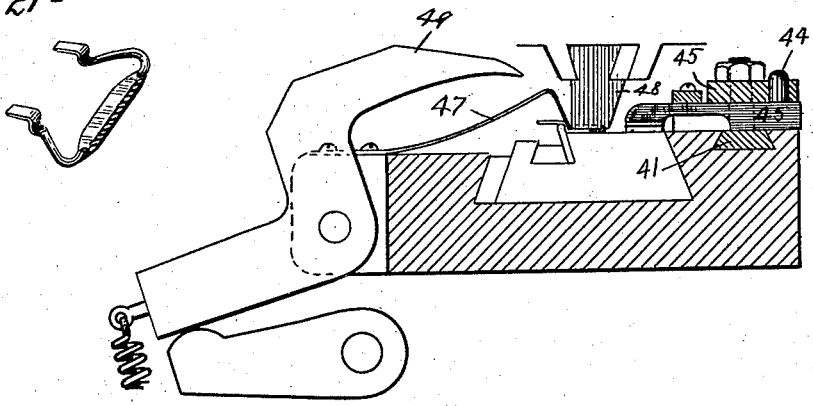
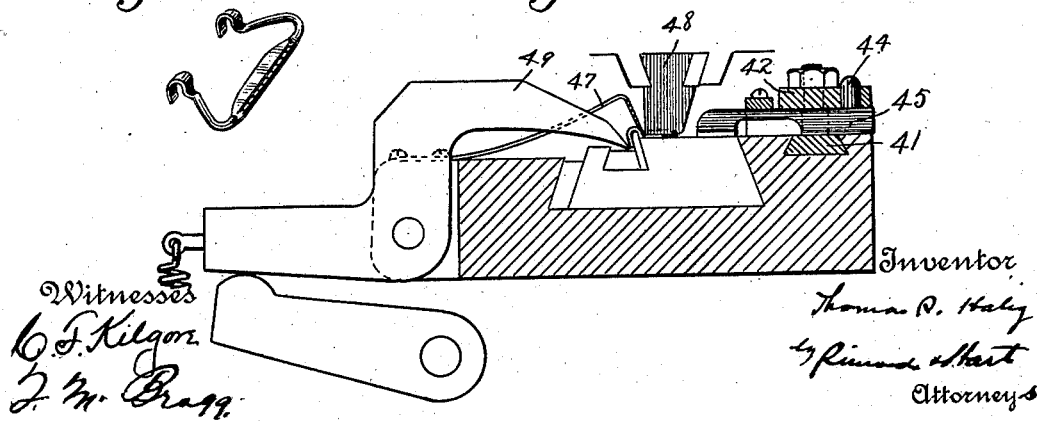

No. 749,730. PATENTED JAN. 19, 1904.
T. S. HALEY.
WIRE WORKING MACHINE.
APPLICATION FILED MAY 25, 1901.
NO MODEL. 14 SHEETS—SHEET 13.
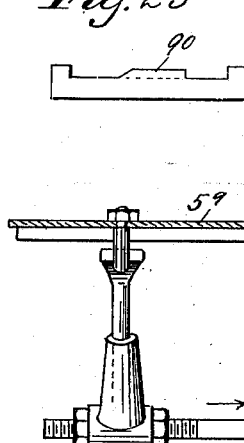
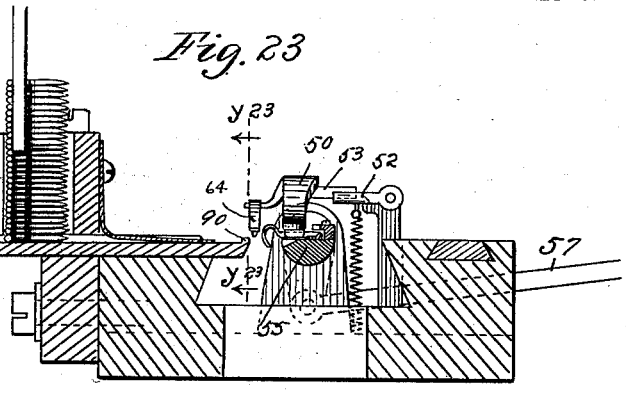
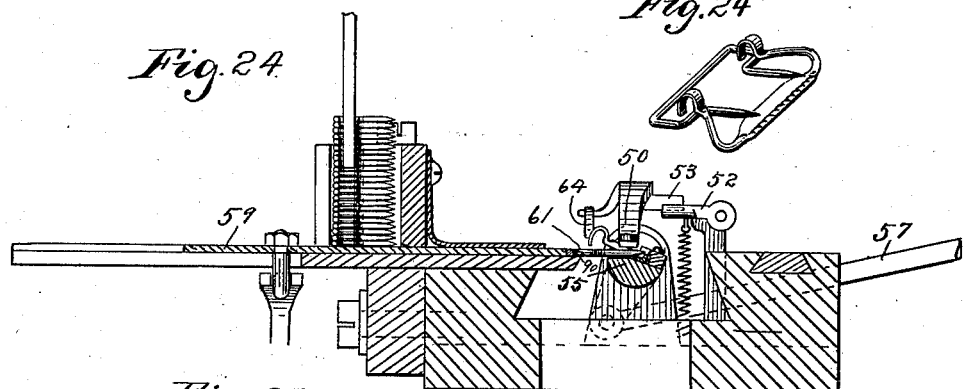
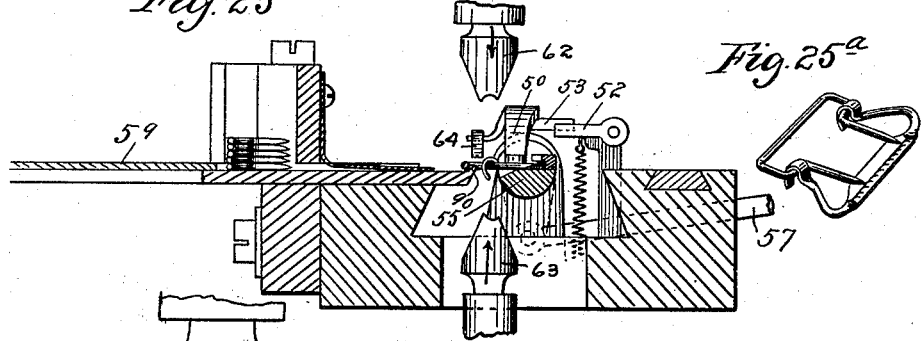
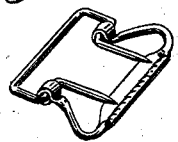
Witnesses
C. F. Kilgore
J. M. Bragg
Inventor
Thomas S. Haley
by Simonds Hart
Attorneys
THE NORRIS PETERS CO., PHOTO-LITHO., WASHINGTON, D. C.

No. 749,730. PATENTED JAN. 19, 1904.
T. S. HALEY.
WIRE WORKING MACHINE.
APPLICATION FILED MAY 25, 1901.
NO MODEL. 14 SHEETS—SHEET 14.
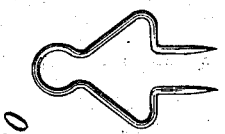
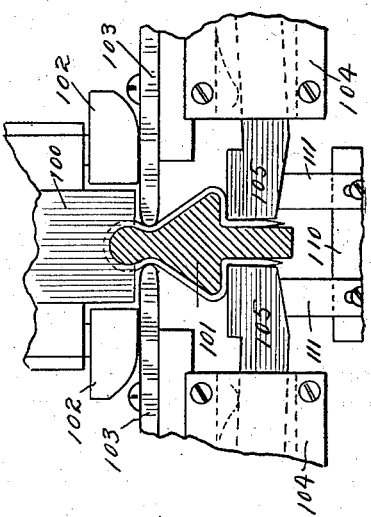
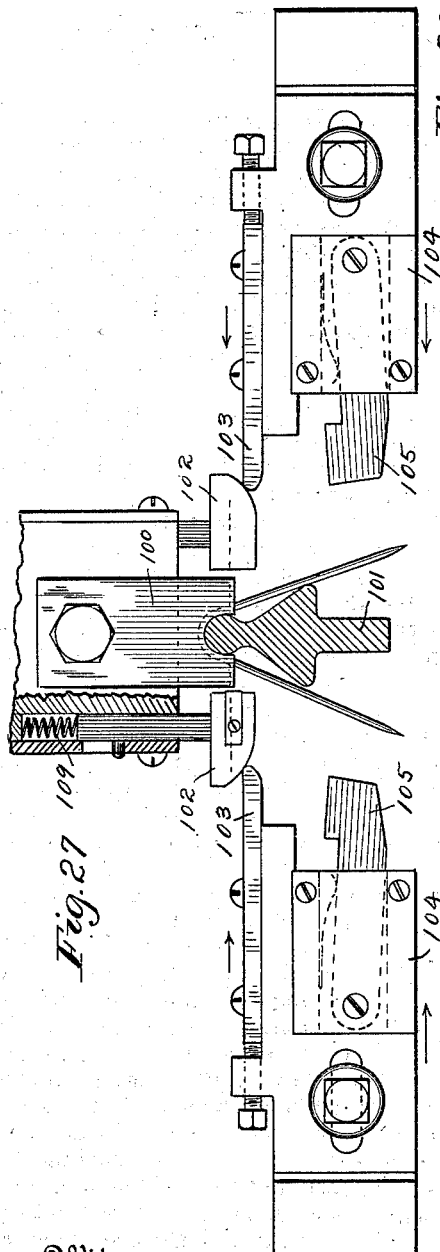
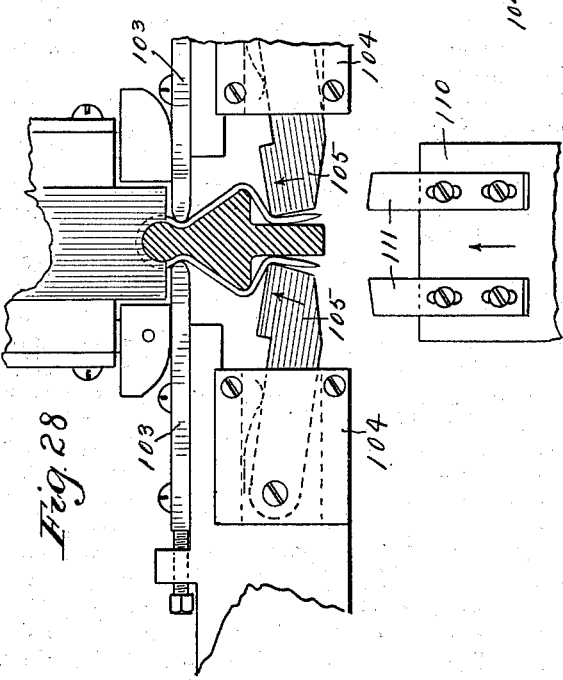
Witnesses
Inventor
Thomas S. Haley
Attorneys No. 749,730.  
Patented January 19, 1904.

UNITED STATES PATENT OFFICE.

THOMAS S. HALEY, OF NEW HAVEN, CONNECTICUT, ASSIGNOR TO THE WIRE NOVELTY MANUFACTURING COMPANY, OF NEW HAVEN, CONNECTICUT, A CORPORATION OF CONNECTICUT.

WIRE-WORKING MACHINE.

SPECIFICATION forming part of Letters Patent No. 749,730, dated January 19, 1904.

Application filed May 25, 1901. Serial No. 61,869. (No model.)

*To all whom it may concern:*

Be it known that I, THOMAS S. HALEY, a citizen of the United States, and a resident of New Haven, county of New Haven, State of Connecticut, have invented certain new and useful Improvements in Wire-Working Machinery, of which the following is a description, whereby any one skilled in the art may make and use the same.

The object of my invention is to provide a machine of the class specified having features of novelty and advantage.

Figure 1:
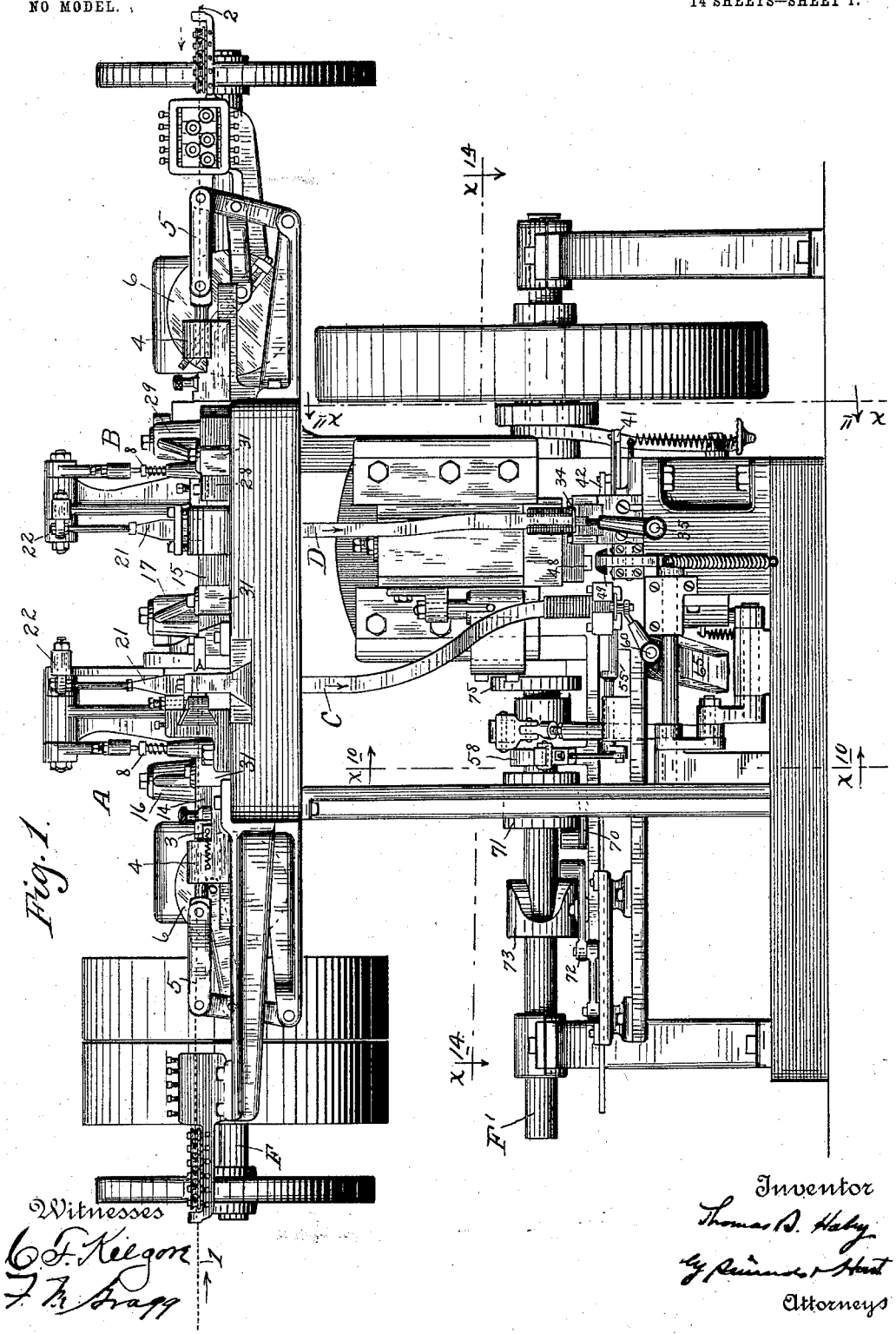
Figure 2:
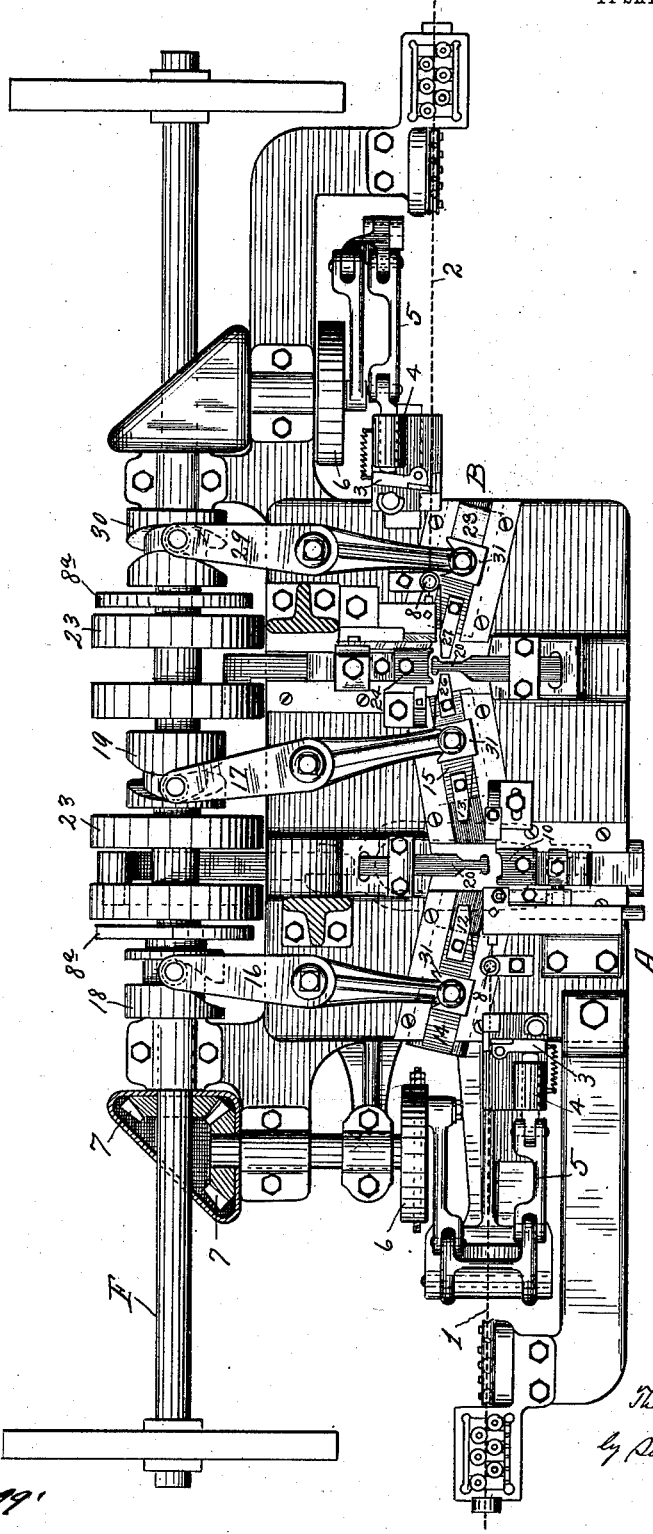
Figure 3:
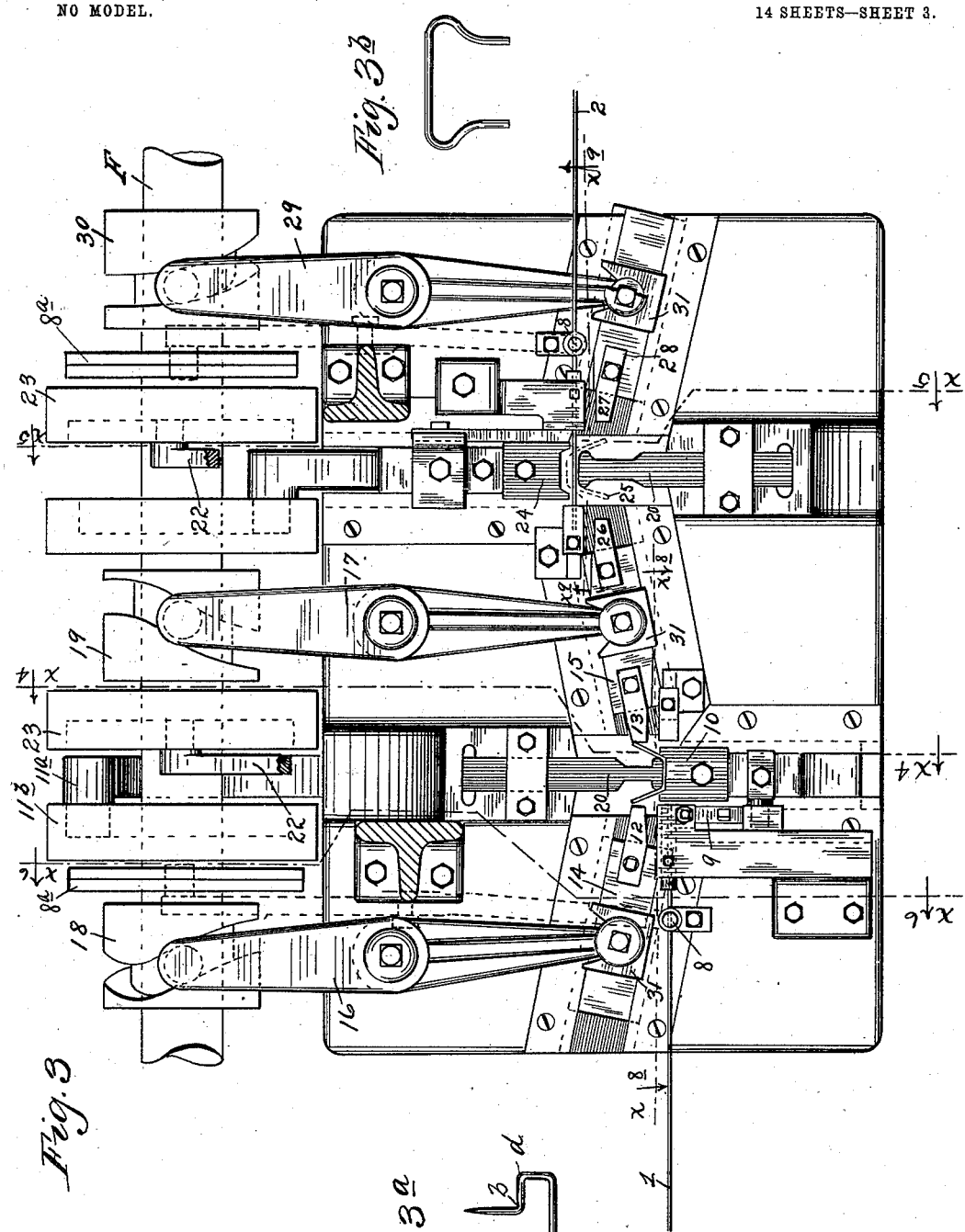
Figure 4:
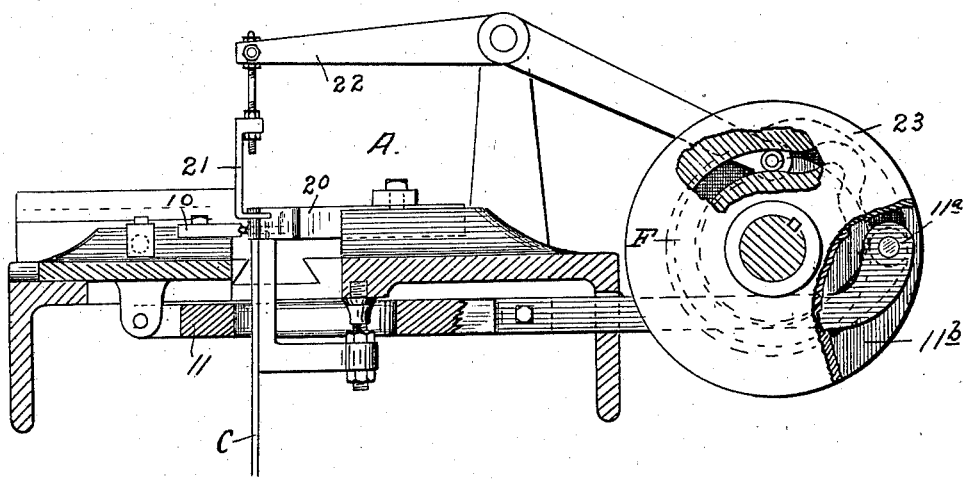
Figure 5:
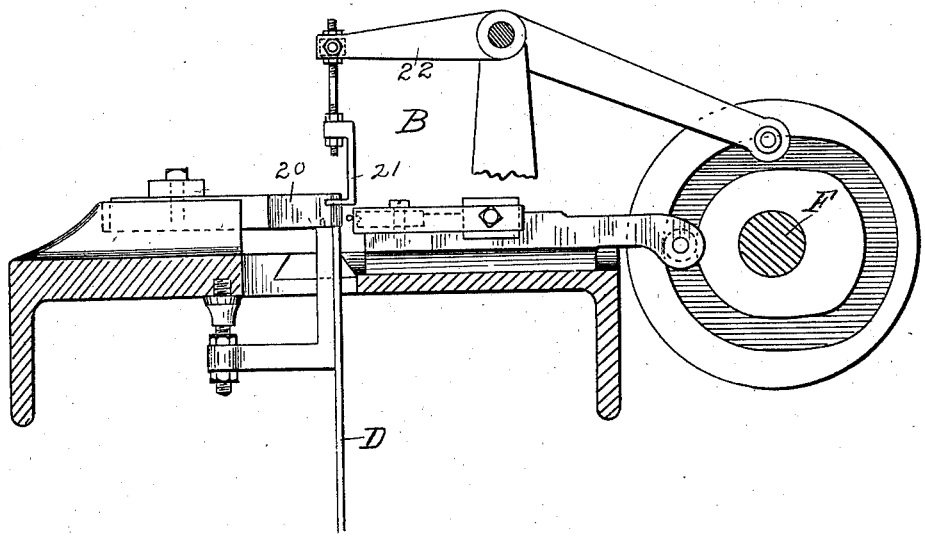
Figure 6:
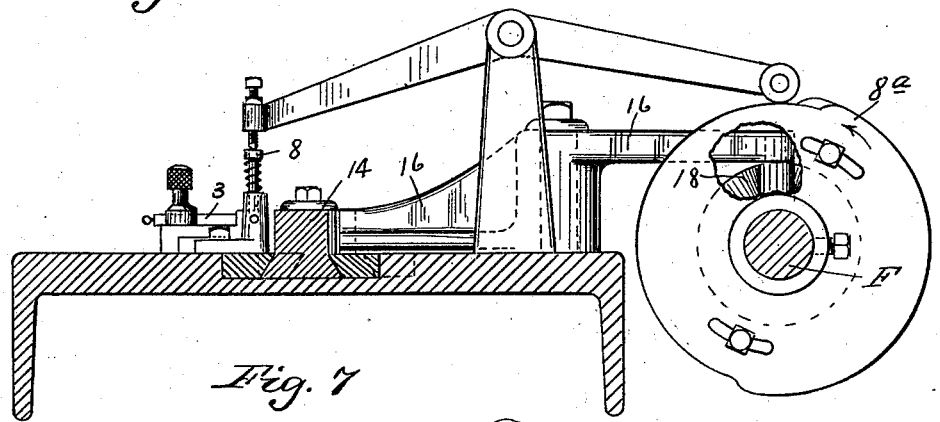
Figure 7:
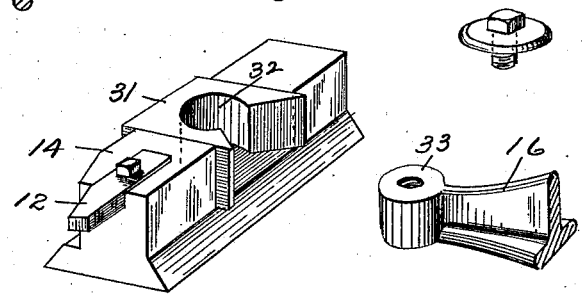

Referring to the drawings, Figure 1 is a front elevation of a machine embodying my invention. Fig. 2 is a plan view of the machine. Fig. 3 is a plan view of the upper dies on an enlarged scale. Fig. $3^a$ shows the buckle-tooth which is a product of the dies at the left-hand side of the upper part of the machine. Fig. $3^b$ is a buckle-loop the product of the dies on the right-hand side of the upper part of the machine. Fig. 4 is a side elevation of the upper part of the machine, sectional, with some parts broken away, on the line $x^4 x^4$ of Fig. 3 looking in the direction of the arrow. Fig. 5 is a side elevation of the upper part of the machine, sectional, on the line $x^5 x^5$ of Fig. 3 looking in the direction of the arrow. Fig. 6 is a side elevation of the upper part of the machine in section, with parts broken, on the line $x^6 x^6$ of Fig. 3 looking in the direction of the arrow. Fig. 7 is a detail of the sliding block or cross-head which carries the forming-tool and its connection with the operating arm or lever. Fig. 8 is a detail front elevation of the upper part of the machine on the line $x^8 x^8$ of Fig. 3 looking in the direction of the arrow. Fig. 9 is a detail front elevation of the upper part of the machine on the line $x^9 x^9$ of Fig. 3 looking in the direction of the arrow. Fig. 10 is a side elevation of the lower part of the machine on the line $x^{10} x^{10}$ of Fig. 1 looking in the direction of the arrow. Fig. 11 is a side elevation of the lower part of the machine on the line $x^{11} x^{11}$ of Fig. 1 looking in the direction of the arrow. Fig. 12 is a view of the dies and appurtenant parts shown in Fig. 11. Fig. $12^a$ shows the blank to be operated on by the die in Fig. 12. Fig. 13 shows the dies of Fig. 12 acting upon the blank. Fig. $13^a$ shows the blank after it has been operated upon by the dies of Fig. 12. Fig. 14 is a plan view of the lower part of the machine, taken on the line $x^{14} x^{14}$ of Fig. 1. Fig. 15 is a detail of the transfer mechanism shown in the lower part of Fig. 14. Fig. 16 is a view on the line $x^{16} x^{16}$ of Fig. 15. Figs. 17, 18, and 19 are detail views similar to Fig. 15, showing parts in different positions. Figs. 20, 21, and 22 show the different positions of the flattening and bending tools. Fig. $20^a$ shows the blank as it goes into the dies in Fig. 20. Fig. $21^a$ shows the blank after the dies of Fig. 20 have operated upon it. Fig. $22^a$ shows the blank after the bending operation shown in Fig. 22. Figs. 23, 24, 25, and 26 show the assembling dies and operations. Fig. $23^a$ is a view on the line $y y$ of Fig. 23, showing the stop against which the buckle-teeth are fed. Fig. $24^a$ shows the relative position of the loop and tooth as they appear in Fig. 24. Fig. $25^a$ shows the relative position of the loop and tooth as they appear in Fig. 25, ready to be united. Fig. $26^a$ represents the finished buckle after the parts have been secured together by the dies shown in Fig. 26. Figs. 27, 28, and 29 show a set of dies which may be used in this machine to form a buckle-tooth such as shown in Fig. 30.

I have illustrated my invention in a machine for making buckles, as this is one of the uses to which it has been successfully applied. The buckle herein shown is made up of two parts—the tooth and the loop—the ends of the loop being bent around the tooth, hinging the parts together. Heretofore in manufacturing buckles of this kind it has been customary to cut and bend the wire forming the loop in one machine, to cut and bend the wire forming the tooth in a second machine, to flatten out the face and ends of the loop in a third machine, and, finally, to place the loop and the tooth together by hand and to insert them into a press which closed the flattened ends of the loop around the tooth. In the machine which I have illustrated in the drawings wire from the reels is fed in at both sides of the machine to separate dies arranged in the upper part thereof. The dies B at the right cut the wire and bend it into the shape of the loop. The dies A at the left cut the wire on an angle to point it and form it into the shape of the tooth. What may be termed "strippers" push the loop and the tooth off of the forming-dies onto the "strings" C D, down which the blanks slide to the lower part of the machine. The tooth is now ready to be assembled; but the loop has to undergo further operations, as flattening the face and ends and bending the flattened ends preparatory to their being rolled around the buckle-tooth in the final operation. In the machine illustrated in the drawings these operations on the loop take place in the following order: First, the ends are upset and flattened; second, the face of the loop is flattened in dies remaining closed while the flattened ends are being bent. The loop is then moved over in line with the feeding-slide for the tooth. Its bent ends are rocked up, while the tooth is moved to its proper position with respect to the loop. The loop is then rocked back, and finishing-dies roll the flattened end of the loop around the tooth, hinging them together, the completed buckle being then dropped through a spout into any suitable receptacle. An automatically-operated plunger feeds the loop-blank to the first set of dies. Transfer devices move the blank after the first operation to the second set of dies and from there to the third or assembling dies, where an automatically-operated plunger feeds the tooth to the loop, and a transfer device takes the finished buckle and drops it out of the machine. This is a general outline of the working of the machine illustrated.

Fig. 1 is a front elevation of the machine, showing the wires 1 2 fed through straightening-rolls to the dies A B. The feeding device may be of any desired construction, the one shown in the drawings consisting of the pivoted clutch-plates 3, carried by reciprocating heads 4, operated from the shaft F through the cranks 5 6 and the bevel-gears 7, all clearly shown in Fig. 2. When a proper length of wire necessary to form the loop or tooth is fed to the dies, a pin 8, operated by a cam $8^a$ on the shaft F, grips the wire and holds it while the feeding-dies retreat. This is shown clearly in Fig. 8. Just after the pin 8 grips the wire 1 an angular cutter 9 moves across the cutting-block $10^a$, shearing the wire on an angle and pointing it. The cutter is carried by and set slightly in advance of the die 10, Fig. 3, which performs the first operation of forming the buckle-tooth, the cutter traveling on an inclined block and being held in position by a suitable guide. As shown in the drawings, this guide is in the nature of a block $9^a$, held in place in the frame of the machine by a bolt $9^b$. This die 10 is moved by the link 11, Fig. 4, carrying at its end a roller $11^a$, working in a slot in the cam $11^b$, secured to the shaft F, and bends the wire into the shape shown in Fig. 3. Dies 12 13, carried by the reciprocating cross-heads 14 15, are now moved up by the pivoted levers 16 17, which are moved by the cams 18 19, and crimp the wire around the forming-die 20, bending it into the shape shown in Fig. $3^a$, producing the finished buckle-tooth ready to be assembled with the loop. A stripper 21 (shown in Fig. 4) is actuated by the lever 22, carrying at its end a roller moving in a slot in the cam 23. As soon as the dies 12 13 have operated on the wire and started to recede the stripper moves downward, pushing the tooth off from the forming-block onto the flat rod C, and the tooth slides down this rod into the position to be fed into the lower part of the machine for assembling with the loop. These flat rods C and D (shown clearly in Figs. 10 and 11) are called "strings" and will be so referred to hereinafter. At the right-hand side of the machine the wire is held after it is fed into the die by the pin 8. The wire is cut off square, and the die 24 moves up and bends it, as shown in dotted lines at 25, Fig. 3. The dies 26 27, mounted in reciprocating cross-heads 15 28 and moved by the pivoted arms 17 29, each receive their motion from the cams 19 30 and move toward the former, crimping the wire around it into the shape shown in Fig. $3^b$. These parts all operate in the manner described above with reference to the dies A, a similarly-acting stripper pushing the loop from the forming-die onto the string D, down which it slides into position to be fed into the dies for further manipulation. It will be noticed with reference to Fig. 3 that the forming-block 20 at B is set in a position the reverse of the forming-block 20 at A and that the dies 10 24 move in opposite directions. By arranging the dies with this relation to each other the loop and the tooth as they drop down the strings to the lower part of the machine occupy the proper positions for assembling and the expense of construction is greatly reduced, as by this arrangement I am enabled to use the cross-head 15 for carrying two dies 13 26, one of which operates on one side of the tooth as the cross-head moves in one direction and the other operates on the side of the loop as the cross-head moves in the opposite direction. It will be noticed that the direction of movement of the dies 12 13 26 27 is along a line at an angle to the head of the forming-die. This permits me to get a clean sharp bend at the points $a$ $b$ of the tooth and loop. In buckle-machines which have been used heretofore the line of movement of the dies which perform this operation on the buckle has been parallel to the head of the forming-die, and it has been found in practice that in order to get a clean sharp bend at the points $a$ $b$ it was necessary to set the dies so closely together that they would cut away and thin down the metal at the points $c$ and $d$. My arrangement of these dies with relation to each other entirely obviates this difficulty and produces a tooth or a loop which is of uniform size throughout and clearly and sharply outlined. The method of connecting the reciprocating cross-heads with the levers 16, 17, and 29 is shown clearly in Fig. 7. The block 31 is mounted in the cross-head and has a movement crosswise thereof and is recessed, as at 32, to receive the enlarged head 33 of the lever, forming what is substantially a swivel connection therewith. The movement of the block crosswise of the cross-head and this swivel connection of the lever with the block provides for any angular movement of the parts with relation to each other. The buckle-teeth as they are formed drop down the string C into position ready to be assembled with the loops. The loops drop down the string D into positions shown in Figs. 11 and 12. A plunger 34, operated by the arm 35, which is moved by the cam 36 through the lever 37, feeds the loop to the dies 38 39. The position of the loop with relation to the dies is determined by the notched plate 41, and it is held in place by the spring 40. Fig. 12$^a$ shows the blank which is fed to the dies 38 39. These dies now close, as shown in Fig. 13, to flatten the ends of the loop and upset them slightly, as shown in Fig. 13$^a$. This blank is now transferred to the next set of dies by the plate 41, which is operated by the pivoted lever 70 and the cam 71. The plate 42, moving with the plunger 41, has a cam-slot 43, in which works a pin 44, secured to the stop 45, and as the plate 41, with the loop, moves to the left this stop 45 is moved into the position shown in Fig. 17 just in time to limit the movement of the loop to the left, and the loop now occupies the position shown at 46 in Fig. 17 and in side view in Fig. 20 and is held in position by the spring 47. The plunger 41 and the stop 45 now recede to their original positions and the die 48 drops, flattening out the face of the loop, as shown in Figs. 21 and 21$^a$. The operating mechanism of the die 48 is arranged so that the dies remain closed and hold the loop in position while the bending-die 49 bends down the flattened ends of the loop, as shown in Fig. 22, producing the loop in the form shown in Fig. 22$^a$. The die 48 is now raised and a transfer-finger 50, operated by the lever 72 and the cam 73, moves up to the position shown in Fig. 15, catches the loop and retreats, carrying with it the loop to the position shown at 51, Figs. 16, 17, and 18, and in cross-section in Fig. 23. In the forward movement of the transfer-finger it is raised slightly as it passes from one side of the loop by the lug 53, riding up on top of the bridge 52. As the finger reaches the forward limit of its movement the lug 53 drops off of the bridge 52 and the finger drops into the loop and then retreats, the lug 53 passing under and raising the bridge 52. As shown in Fig. 23, the loop now rests on the plate 55, which is connected by the crank 56 and the link 57 with the cam 58, mounted on the shaft F', and through these agencies receives a rocking motion, which raises the bent end of the loop upward slightly. At this time a plunger 59, operated by the link 60, which is connected with the shaft F', moves a tooth up into the position shown at 61, Fig. 24, the relative positions of the tooth and the loop being as shown in Fig. 24$^a$. The plate 55 is now rocked back into its normal position, as shown in Fig. 25, the two parts of the buckle now occupying the position shown in Fig. 25$^a$. The dies 62 63 now close, as shown in Fig. 26, rolling the bent end of the loop about the tooth, completing the buckle, as shown in Fig. 26$^a$. As the dies 62 63 recede a finger 64, carried by the transfer-finger 50, moves over and drops into the finished buckle and retreats, carrying the buckle with it to the spout 65, into which the buckle drops.

In the above description I have followed a single loop and a single tooth through the various operations to which they are subjected until they are secured together in the form of a finished buckle and dropped from the machine. The operation of the machine is of course continuous, and at all times there is a tooth and loop being formed to shape in the upper part of the machine, a loop being operated on by the first and second set of dies and a loop and tooth being assembled into a finished buckle by the third set of dies in the lower part of the machine. The movements of the dies both in the upper and lower parts of the machine are controlled positively in both directions and are set to perform their operations in regular order. The movements of the feeding and transfer devices, which keep each set of dies full, are controlled by cams mounted on the shafts F F'. The forward movements of the feeding and transfer devices are negative—that is to say, they are controlled by springs which cause the rollers at the ends of the levers to follow the contour of the cams. The backward or retreating movements of the feeding and transfer devices are positive—that is to say, the cams positively move the levers to cause a backward movement of the parts. Reference to Figs. 10 and 11 will clearly illustrate what I mean by the positive and negative movements of the feeding and transfer devices. Take, for instance, the feed for the buckle-tooth shown at 59, Figs. 10 and 14. This is connected through the link 60 with the lever 75, pivoted at 76 and having at its end a roller 77, riding on the cam 74. The spring 78 is connected with the link 60 and with a stationary part of the machine. When these parts occupy the positions shown in Fig. 10 the roller under the influence of the spring 78 is following the low part of the cam and the plunger 59 is feeding a tooth into its proper position for assembling with the loop. As the high part of the cam comes around it drives the upper part of the lever to the left and the lower part to the right, which moves the plunger 59 positively away from the dies. The same is true of the plunger 34, connected by the link 35 with the lever 37, carrying at its end a roller riding on the cam 36, the spring 35$^a$ causing the roller to follow the low part of the cam and moves the plunger 34 forward to feed a loop to the dies. As the roller rides up on the high part of the cam the plunger is positively moved outward away from the dies. The same thing is true of the transfer-fingers 50 and 64 and the transfer-plate 41, which are moved positively outward by the cams 73 and 71 and moved forward under the influence of the springs 80, 81. It is clear that if the dies become clogged and these parts move forward to feed or transfer as they strike the obstruction their forward movement will stop and the spring will yield. If the parts were positively driven forward as they struck the obstruction something would have to give, and the parts thus would be bent or broken before the machine could be stopped. I have found in practice that in order to get the parts in their proper positions, especially the tooth to be assembled with the loop as it is moved into position, it is advisable to feed the blanks against a stop 90, Fig. 23$^a$, which determines their position, and this would not be possible unless the forward movement of the feeding device were negative or yielding.

Figs. 27, 28, and 29 illustrate the operation of the dies which may be inserted in the upper part of the machine in place of the dies shown at A to form a buckle-tooth of the shape shown in Fig. 30. The wire may be fed from the reel into the die 100, or it may be previously cut to the proper lengths and supplied to the die. This die then moves up onto the forming-block 101 into the position shown in Fig. 27. The die-holders 104 then move up toward the forming-block 101, and the dies 103 and 105 bend the wire into the shape shown in Fig. 28. The wings 102 are moved back against the spring 109 by the dies 103 as they move forward. The plunger 110 next moves up, and the fingers 111 engage the dies 105 and throw them into the position shown in Fig. 29, completing the tooth. These dies then recede and a stripper pushes the finished tooth from the forming-block onto a string, such as C in Fig. 1.

It is clear that any kind of dies for manipulating wire stock may be substituted in this machine for the dies shown and operated successfully, and what I claim, broadly, as new is a machine which will take the stock from the reel and after passing it through various operations deliver a finished article and, further, a machine for automatically shaping, assembling, and uniting the parts of any article, such as a buckle, and of the details of arrangement and construction herein shown.

I claim as my improvement—

1. In combination in a machine of the class specified, a group of cutting and forming dies, a group of finishing-dies and assembling mechanism, feeding devices from the first to the second group of dies, and transfer devices from one to the other of the finishing-dies and to the assembling mechanism, substantially as set forth.

2. In combination in wire-working machines, a pair of shaping or forming dies, a lower set of finishing-dies, and assembling mechanism, feeding devices from the first set of dies to the second set, and transfer devices from one to the other of the second set of dies, substantially as set forth.

3. In combination in wire-working machinery, groups of dies arranged to cut wire from the reel and form it in one part of the machine, and feeding devices from the above-named dies, a group of finishing-dies, and assembling mechanism located in another part of the machine, and transfer devices for moving the blank from one to the other of this second set of dies and to and from the assembling mechanism.

4. In combination in a machine of the class specified, a group of cutting, pointing and shaping dies, a group of finishing-dies, and assembling mechanism, feeding devices from the first set of dies to the second set, and means for automatically transferring the blank from one to the other of the finishing-dies and to and from the assembling mechanism, substantially as described.

5. In a buckle-making machine, a set of dies for forming the loop, and a second set of dies for pointing and forming the tooth, dies for flattening the face of the loop and for flattening and bending the ends thereof, transfer devices from one set of dies to the other and from there to the assembling mechanism, means for feeding the tooth to its proper position with relation to the loop, means for raising the ends of the loop while the tooth is being fed to place, and means for closing the ends of the loop about the tooth.

6. In a machine of the class specified, means for automatically transferring blanks from one set of operating-dies to another, and means for automatically assembling the parts of the article.

7. In a machine of the class described, the automatically-operating assembling mechanism comprising a rocking plate and closing dies.

8. In a machine of the class specified, means for assembling the parts of an article comprising a rocking plate carrying one of the parts, a feed and stop device for the other part, and closing dies for forming the hinge-connecting joint, substantially as described.

9. In a machine of the class specified, means for assembling the parts of an article comprising devices for transferring one of the parts to a rocking plate, means for rocking the plate, means for feeding in the other part to its proper position, and means for securing the parts together.

10. The herein-described assembling mechanism comprising a rocking plate supporting one of the parts to be assembled, and a feeding device for the other part.

11. The combination in a buckle-making machine, with the assembling mechanism comprising a plate supporting one of the members, a feeding device for the other member, and means for rocking the plate when the second member is fed into position.

12. Means for automatically uniting the parts of a buckle, comprising a rocking plate on which one of the members is located, means for rocking the plate, a feeding and stop device for the other member arranged to feed it toward the first member while the rocking plate is up, and closing dies for uniting the two members, substantially as described.

13. In a machine of the class specified, means for feeding the blanks to the dies and stops arranged to determine the position of the blanks, substantially as described.

14. In a wire-working machine, the combination with the sets of dies arranged adjacent to one another and adapted to act successively upon a blank, and means for moving a blank from one set of dies to another, of stops adapted to properly position the blank at the dies.

15. In a wire-working machine, the combination with the sets of dies arranged adjacent to one another and adapted to act successively upon a blank, and means for moving a blank from one set of dies to another, of stops adapted to properly position the blank at the dies, and means for holding the blank in position.

16. In a wire-working machine, the combination with the sets of dies arranged adjacent to one another and adapted to act successively upon a blank, transfer devices for moving the blank from one set of dies to another, stops adapted to properly position the blank at the dies, and springs for holding said blank in position.

17. In a wire-working machine, the combination with a group of dies arranged adjacent to one another, and a stop adapted to determine the position of a blank at the first set of dies and to move said blank to a second set of dies after the operation of the first-mentioned set, of a second stop actuated by the movement of the first-mentioned stop and adapted to position the blank at the second set of dies.

18. In a buckle-making machine, the combination with the dies for flattening the face and turning the ends of the buckle-loop blank, and means for moving the blank to said dies, of a stop adapted to be brought into the line of movement of the blank to position it at the second set of dies, substantially as described.

19. In a machine of the class specified, the dies for flattening the ends of the loop, automatically-operated devices for feeding blanks to said dies, a stop, and means for holding the blank in position between the dies.

20. In a buckle-making machine, the combination with the dies for flattening the face of the buckle-loop blank, of a stop to properly position the blank between the dies.

21. In a buckle-machine, dies for flattening the ends of the buckle-loop blank, dies for flattening the face of the loop located adjacent thereto and adapted to remain closed while the ends of the loop are bent, and means for automatically transferring the loop from the first to the second set of dies, substantially as described.

22. In a buckle-making machine, the combination with the dies for flattening the ends of a buckle-loop blank, and devices for feeding blanks to said dies, of a stop to properly position the blank at the dies, and means for maintaining the blank in position.

23. In a buckle-making machine, the combination with the dies for flattening the ends of the buckle-loop, and devices for feeding blanks to said dies, of a stop adapted to hold the blank in position while said dies are operating, and means for moving said stop in such manner that it transfers the blank to an adjacent set of dies.

24. In an automatically-operating buckle-machine, the combination with the dies for flattening the face of a buckle-loop, of a bending-die independent of the flattening-die and adapted to act upon the ends of the loop while the flattening-dies are closed.

25. The herein-described transfer devices comprising one or more hooked fingers, a lug, and a pivoted bridge coöperating therewith.

26. In a machine of the class specified, the combination with the finishing-dies and assembling mechanism, of automatically-operated transfer devices for moving the pieces from one set of sides to another and to the assembling mechanism, and means for disengaging the transfer devices from the pieces at the beginning of their return movement, substantially as described.

27. In a machine of the class specified, the automatically-operated transfer devices comprising the fingers, a lug thereon, and a movable bridge, said lug being adapted to override said bridge to disengage the transfer devices at the beginning of their return movement, substantially as described.

28. In a machine of the class specified, the forming-blocks, guides arranged at an acute angle thereto, and reciprocating forming-dies fitting in and moving along said guides in a direction at an acute angle to the forming-blocks, substantially as described.

29. In a machine of the class specified, two forming-blocks arranged side by side and in reversed positions, and a reciprocating crosshead located between said forming-blocks and carrying forming-dies which coöperate alternately with the forming-blocks; and forming-dies coacting with the outer faces of the forming-blocks; all of said forming-dies moving in a direction at an acute angle to the forming-blocks, substantially as described and for the purposes set forth.

30. In a machine of the class specified, a plurality of forming-blocks arranged side by side and in reversed positions, a reciprocating cross-head arranged between said forming-blocks with angular relation thereto and carrying at each end a die adapted to coöperate with one or the other of said forming-blocks at each end of its movement.

31. In a machine of the class specified, reciprocating forming-dies arranged in angular relation to the forming-block, and a compensating connection between said reciprocating dies and their operating-levers, substantially as described.

32. The forming-blocks, the cross-heads movable at acute angles to the forming-blocks and carrying forming-dies, levers pivoted at points between their ends, and a compensating connection between the levers and the cross-heads, substantially as described.

33. The combination of the forming-blocks, 20, 20, the end forming-dies, 10, 24, and the side forming-dies 12, 13 and 26, 27 moving in a line at an acute angle to the forming-blocks, all operating as and for the purposes specified.

34. The combination with the forming-block and the forming-dies carried by reciprocating cross-heads, of a block carried by and movable crosswise of said cross-heads, and a lever having one end pivotally secured to said block, substantially as described.

35. In a machine of the class specified, the combination with the forming-dies, of the "strings" and a positively-actuated stripper adapted to move the blank from the forming-block to the strings, substantially as described.

36. Means for simultaneously cutting and pointing wire comprising a beveled cutting-block and a coöperating beveled cutter, and a guide for said cutter, substantially as described.

37. In a wire-working machine, the combination with the feeding devices for the wire, of a pin adapted to engage the wire when a sufficient length has been fed forward and hold it against displacement during the retreat of the feeding devices.

38. In a wire-working machine, the combination with devices for feeding wire to the cutting-dies, of a pin mounted in a post through which said wire passes, said pin being adapted for movement to engage said wire.

39. In a machine of the class specified, devices for feeding the blanks to the dies and for transferring them from one die to another, the forward and inward movement of said devices being negative and their outward movement being positive, substantially as described.

40. The combination in a machine of the class described, of a cutting and gripping mechanism; blank-forming dies which move to form the blank while the material is held by said mechanism; transfer devices for shifting the blanks; finishing means; and mechanism for assembling the parts.

41. The combination of a cutting, gripping and bending mechanism by which the material is cut, gripped and initially bent; blank-forming dies which complete the formation of the blank; transfer devices for shifting the blanks; finishing means; and mechanism for assembling the parts.

42. The combination of devices which initially bend the material and then dwell; mechanism which moves to complete the formation of the blank during said dwell; transfer devices for shifting the blanks; finishing means; and mechanism for assembling the parts.

43. The combination of coöperating dies by which the material is initially bent to form a blank; a cutter carried by one of said dies; and blank-forming dies by which the blank is completed while upon the other of said dies.

44. In a machine of the class described, the combination of a cutter-carrying die by which the material is cut and given an initial bend about a forming-block; said forming-block; and blank-forming dies by which the formation of the blank upon said block is completed.

45. The combination in a machine of the class described of forming-dies; assembling mechanism; and gravity transfer devices interposed therebetween.

46. The combination in a machine of the class described of forming-dies; stripping devices; gravity transfer devices; and assembling mechanism.

47. In a machine of the class described, cutting devices by which the stock is cut into the desired lengths; blank-forming devices by which the stock is bent into the desired shapes *in situ* where it is cut; transfer devices for shifting the blanks; and means for finishing and assembling the parts.

48. The combination of forming-dies; transfer devices for shifting the blanks; finishing mechanism for preparing the blanks for assemblage; devices by which the parts are positively positioned for assemblage; and assembling mechanism.

49. In a machine of the class described, the combination of flattening-dies by which the loop-blank is flattened, said dies dwelling after closing to flatten said blank; bending-dies by which the points of the said blank are shaped while said flattening-dies dwell; transfer devices by which the parts are positively positioned for assemblage; and assembling mechanism.

50. In a machine of the class described, the combination of flattening-dies by which the blank is flattened, said dies dwelling after closing to flatten said blank; and bending-dies by which are bent the points of said blank while it is held by the flattening-dies.

51. In a machine of the class described, the combination of a forming-block for the loop-blank; a forming-block for the tooth-blank; and a blank-forming mechanism common to and coöperating with both of said blocks.

52. In a machine of the class described, the combination of dies for forming the loop-blank; and dies for forming the tooth-blank; said dies for forming the loop-blank being reversed in position in relation to the dies for forming the tooth-blank.

53. In a machine of the class described, the combination of cutting devices; with blank-forming dies by which the material is gripped and shaped *in situ* where cut without the intervention of transfer means between said devices and dies; means for shifting the blanks; and finishing and assembling mechanism.

54. In a machine of the class described, the combination of means for retaining the loop-blanks in a pile, one above the other; feeding devices for feeding said blanks to finishing-dies by which the loop-blank is shaped for assemblage; shifting devices by which the loop-blank is shifted from the finishing-dies to assembling mechanism; said finishing-dies; and said assembling mechanism.

55. In a machine of the class described, the combination of means for retaining the loop-blanks in a pile, one above the other; feeding devices for feeding said blanks to finishing-dies; said finishing-dies; shifting devices by which the loop-blank is shifted from said finishing-dies to assembling mechanism; means for feeding and positioning the tooth-blank with relation to the loop-blank for assemblage; and said assembling mechanism.

56. In a machine of the class described, the combination of feeding devices for feeding the loop-blanks to finishing-dies; said finishing-dies; shifting devices by which the loop-blank is shifted from said finishing-dies to assembling mechanism; means for retaining the tooth-blanks in a pile one above the other; means for positioning the tooth-blank with relation to the loop-blank for assemblage; and said assembling mechanism.

57. In a machine of the class described, the combination of means for retaining the loop-blanks in a pile, one above the other; feeding devices for feeding the loop-blanks to finishing-dies; said finishing-dies; shifting devices by which the loop-blank is shifted from said finishing-dies to assembling mechanism; means for retaining the tooth-blanks in a pile, one above the other; means for positioning the tooth-blank with relation to the loop-blank for assemblage; and said assembling mechanism.

58. In a machine of the class described, coöperating dies by which the loop-blank is finished for assemblage; a transfer-finger which catches and shifts said blank to assembling mechanism; means for positioning the tooth-blank with relation to the loop-blank for assemblage; and said assembling mechanism.

THOMAS S. HALEY.

Witnesses:
D. O. KREINENDAHL,
H. A. HART.